3,515,882
DEVICE FOR PROTECTING THE HUMAN EYE
AGAINST LASER RADIATION
Walther Hess, Dilsberg-Neuhof, Germany, assignor to
Eltro G.m.b.H. & Co., Heidelberg, Germany
Filed Dec. 19, 1967, Ser. No. 691,733
Int. Cl. H01j 31/50
U.S. Cl. 250—213                                                5 Claims

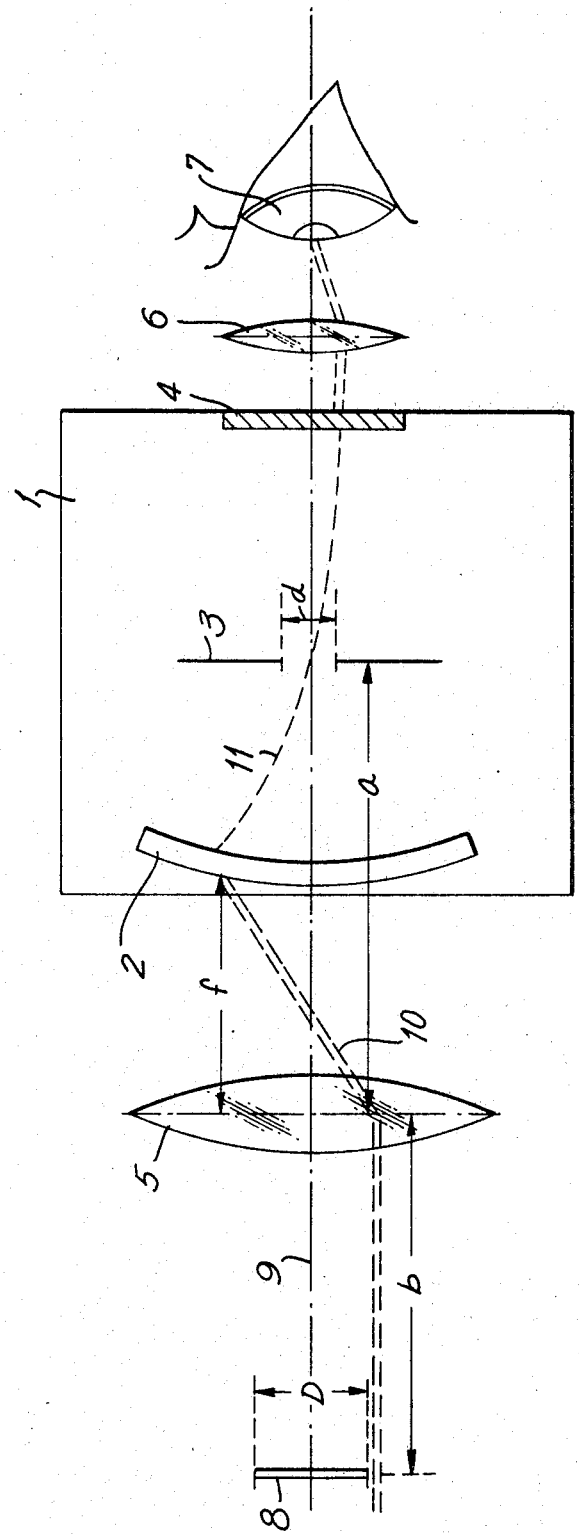

ABSTRACT OF THE DISCLOSURE

To permit viewing of laser beam while preventing injury to the eye, a conventional image converter is interposed between beam and eye. The converter generates a visible image in response to infra-red radiation. A laser beam intercepting device is so positioned relative to the converter as to cooperate with the latter to prevent the beam from passing directly to the viewer.

DRAWING

The sole figure is a schematic diagram showing the arrangement of a converter and intercepting device in accordance with the invention.

DETAILED DESCRIPTION

This invention relates to devices for protecting eyes against laser radiation.

Laser radiation effects are of considerable danger to the human eye as disclosed, for example, in the periodical "Zeitschrift fur Angewandte Physik" (Journal of Applied Physics), vol. 20, Issue No. 6, 1966 (see especially pages 522 through 523). From this publication it is known to use protective eyeglasses with special filter lenses as protection against laser beams.

It has now been discovered, however, that a protection of eyes against laser radiation, far superior to any known technique, can be obtained by using according to the present invention, a light-optical/electron-optical image display system as an eye-protective device. A sufficiently good viewing capability is also provided by such a device.

A device for protecting the eye against laser radiation according to the invention can be constituted as follows: In front of a light-optical/electron-optical image display system, which may be known per se and consists of an objective, a photo-cathode, an electron-optical lens system, a cathode ray screen and observation optics, there is placed a stop disc whose distance $b$ from the objective is determined from the formula $$b = \frac{a \cdot f}{a - f}$$

whereas its diameter D is determined by the relationship $$D = \frac{d \cdot f}{a - f}$$

where $f$=the focal length of the objective, $a$=distance of the aperture stop of the electron-optical lens system from the objetcive, and $d$=the aperture diameter of the aperture stop pertaining to the electron-optical lens system.

By placing the stop in front of the objective, any direct penetration of laser radiation in proximity to the optical axis through the aperture of the electrostatic aperture stop or diaphragm is prevented. Since the diameter D of the stop is directly proportional to the aperture diameter $d$ of the electrostatic aperture stop, it is recommended that the aperture diameter $d$ be chosen as small as possible in order to obtain a correspondingly small stop diameter D. Through this arrangement, the light losses with regard to the quality of the light-optical/electron-optical image will be minimized.

The invention is next explained with reference to the drawing in which a device for protecting the eye against laser radiation is schematically shown in accordance with a preferred embodiment of the invention.

In the drawing, component 1 is an infrared image converter tube, known per se, which essentially consists of a photo-cathode 2, an electrostatic aperture stop or diaphragm 3 of aperture diameter $d$, and a luminous screen 4. Through an objective 5, an infrared image is transmitted to the photo-cathode 2, and an infrared ray 10 is illustrated passing through the objective 5.

An electron beam emitted by the photo-cathode 2, in known manner, at the location of an image point is indicated at 11. The electronic image made visible by the screen 4, also in known manner, is observed through a lens 6 by the eye 7 of an observer behind the lens 6. At a distance $b$ in front of objective 5 is located a mechanical circular stop 8, whose center is located on the optical axis 9.

The shape and diameter D of the stop 8 are chosen, according to the invention, in such a manner as to coincide with the image generated by the objective 5 at the aperture of the electrostatic aperture stop 3. The objective 5 has the focal length $f$. The distance between the objective 5 and electrostatic aperture diaphragm 3=$a$. The stop 8 may consist, for example, of a blackened metal disc which reflects or absorbs the entire direct radiation impinging upon it.

The arrangement shown has been devised in such a manner that damage to the eye, even with the use of the most potent impulse-type lasers, can be avoided with practically absolute safety. The viewing capability with such a device is unimpaired.

If, according to the invention, two axis-parallel systems of the nature described above are combined in a known manner to form a binocular scope, an absolutely laser-proof observation device is obtained.

What is claimed is:

1. A device to permit viewing of but protecting the viewer's eye against damage from a laser beam, said device comprising a light-optical to electron-optical image display means for viewing the beam and converting light-optical images to display images, and beam intercepting means to prevent the beam from passing directly through the display means, said display means including an objective having a focal length $f$, a photo-cathode spaced from said objective to receive images therefrom and responding to the images to generate an electron beam, a diaphragm having an aperture of diameter $d$ and spaced from the objective by a distance $a$, said beam passing through said aperture and a screen responsive to the electron beam to display a visible image, said intercepting means being spaced in front of the objective by a distance $b$ as to which $$b = \frac{a \cdot f}{a - f}$$

and having a diameter D as to which $$D = \frac{d \cdot f}{d - f}$$

2. Apparatus as claimed in claim 1, wherein said intercepting means is a beam blocking device optically related to said system to have, at said diaphragm, an image coinciding, at least aproximately, to said aperture.

3. Apparatus as claimed in claim 1, wherein said intercepting means is a mechanical element impermeable to said laser beam.

4. Apparatus as claimed in claim 1, wherein said display means has an optical axis and said intercepting means is symmetrically arranged on said axis.

5. Apparatus as claimed in claim 1, wherein said photocathode is a transducing device which emits an electron beam in response to infrared radiation.

References Cited

UNITED STATES PATENTS

| | | |
|---|---|---|
| 2,989,643 | 6/1961 | Scanlon. |
| 3,014,147 | 12/1961 | Morton. |
| 3,391,279 | 7/1968 | Detrio. |
| 3,407,297 | 10/1968 | Garrett. |

RALPH G. NILSON, Primary Examiner

C. M. LEEDOM, Assistant Examiner

U.S. Cl. X.R.

250—83.3; 313—101; 356—234